(12) United States Patent
Koller et al.

(10) Patent No.: US 10,781,905 B2
(45) Date of Patent: Sep. 22, 2020

(54) SPROCKET

(71) Applicant: Bayerische Motoren Werke Aktiengesellschaft, Munich (DE)

(72) Inventors: Nikolaus Koller, Martinsried (DE); Andreas Meder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 318 days.

(21) Appl. No.: 15/847,981

(22) Filed: Dec. 20, 2017

(65) Prior Publication Data

US 2018/0180156 A1    Jun. 28, 2018

Related U.S. Application Data

(63) Continuation of application No. PCT/EP2016/065892, filed on Jul. 6, 2016.

(30) Foreign Application Priority Data

Aug. 18, 2015    (DE) .................. 10 2015 215 670

(51) Int. Cl.
*F16H 55/14* (2006.01)
*F16H 55/30* (2006.01)
*F16H 57/05* (2006.01)

(52) U.S. Cl.
CPC ............ *F16H 55/14* (2013.01); *F16H 55/30* (2013.01); *F16H 57/05* (2013.01); *F16H 2055/306* (2013.01)

(58) Field of Classification Search
CPC .......... F16H 55/14; F16H 55/30; F16H 57/05; F16H 2055/306
See application file for complete search history.

(56) References Cited

U.S. PATENT DOCUMENTS

| | | | |
|---|---|---|---|
| 2002/0169044 A1 | 11/2002 | Young | |
| 2005/0014590 A1 | 1/2005 | Wen | |

(Continued)

FOREIGN PATENT DOCUMENTS

| | | |
|---|---|---|
| CN | 102287515 A | 12/2011 |
| CN | 104728329 A | 6/2015 |

(Continued)

OTHER PUBLICATIONS

Chinese-language Office Action issued in counterpart Chinese Application No. 201680024382.9 dated Apr. 15, 2019 with English translation (13 pages).

(Continued)

*Primary Examiner* — Michael R Mansen
*Assistant Examiner* — Robert T Reese
(74) *Attorney, Agent, or Firm* — Crowell & Moring LLP

(57) ABSTRACT

A sprocket for a chain drive, in particular a timing chain drive for an internal combustion engine, is provided. The sprocket includes a radially outer toothed ring and a damping ring. The damping ring is axially spaced apart from, and radially inside of, the toothed ring. The damping ring has a radially outer surface that is shaped to be complementary to link plates of the timing chain. The design of the sprocket results in the damping ring being subject to practically no wear, being producible from a conventional material, and being economical to produce.

4 Claims, 4 Drawing Sheets

(56) References Cited

U.S. PATENT DOCUMENTS

| | | | | |
|---|---|---|---|---|
| 2005/0057097 A1* | 3/2005 | Wu | ................... | F16H 55/14 |
| | | | | 305/194 |
| 2006/0073927 A1 | 4/2006 | Haesloop | | |
| 2011/0300977 A1 | 12/2011 | Hayami et al. | | |

FOREIGN PATENT DOCUMENTS

| | | |
|---|---|---|
| DE | 299 09 603 U1 | 11/1999 |
| DE | 199 43 000 A1 | 12/2000 |
| DE | 199 61 046 A1 | 6/2001 |
| DE | 103 12 340 A1 | 10/2004 |
| DE | 103 27 461 A1 | 2/2005 |
| DE | 603 05 682 T2 | 5/2007 |
| DE | 10 2011 102 463 A1 | 12/2011 |
| JP | 63-214566 A | 9/1988 |
| WO | WO 00/11374 A1 | 3/2000 |
| WO | WO 03/089814 A1 | 10/2003 |
| WO | WO 2007/087501 A1 | 8/2007 |
| WO | WO 2014/133823 A1 | 9/2014 |

OTHER PUBLICATIONS

International Search Report (PCT/ISA/210) issued in PCT Application No. PCT/EP2016/065892 dated Oct. 4, 2016 with English translation (five pages).

German-language Written Opinion (PCT/ISA/237) issued in PCT Application No. PCT/EP2016/065892 dated Oct. 4, 2016 (six pages).

German-language Search Report issued in counterpart German Application No. 10 2015 215 670.2 dated Jun. 14, 2016 with partial English translation (11 pages).

* cited by examiner

SPROCKET

CROSS REFERENCE TO RELATED APPLICATIONS

This application is a continuation of PCT International Application No. PCT/EP2016/065892, filed Jul. 6, 2016, which claims priority under 35 U.S.C. § 119 from German Patent Application No. 10 2015 215 670.2, filed Aug. 18, 2015, the entire disclosures of which are herein expressly incorporated by reference.

BACKGROUND AND SUMMARY OF THE INVENTION

The invention relates to a sprocket having a damping ring.

A sprocket of the generic type is known, for example, from German laid open specification DE 10 2011 102 463 A1. Said laid open specification has disclosed a sprocket which has a plurality of teeth which are configured around the sprocket and can be in engagement with pins, sleeves or rollers of a chain, and at least one damping ring which is provided on at least one side face of the sprocket, with the result that the outer circumferential face of the damping ring passes into contact with chain link plates of the chain. Here, radially on the outside, the damping ring has a plurality of non-cylindrical regions, the radii of which differ from the radius of other regions of the outer circumferential face. The plurality of non-cylindrical regions are configured with the same pitch as the plurality of teeth, and the non-cylindrical regions are configured at locations which correspond in the width direction to the position of the tooth tips of the teeth, said non-cylindrical regions being configured in such a way that their radii are smaller than the radii of the other regions of the outer circumferential face.

Relatively great wear of the damping ring is disadvantageous in said known prior art, on account of relatively great surface pressures in the non-cylindrical regions.

A further sprocket of the generic type is known, for example, from the international patent application with the publication number WO 03/089814 A1. Said known sprocket has a damping ring made from a soft material.

Said sprocket also has the disadvantage that the damping ring is relatively susceptible to wear.

In order to avoid the abovementioned disadvantage, German laid open specification DE 103 27 461 A1 proposes a sprocket of a chain mechanism, having a toothed rim which is configured radially on the outside with an extension of a sprocket which is configured radially within the toothed rim, extends on both sides in the axial direction, and is configured on its radial outer side as a bearing face, coated with elastic material, for the chain links of the chain, the elastic material being configured such that it is reinforced by way of strength supports.

Even if this embodiment alleviates the abovementioned disadvantage somewhat, the damping layer of said sprocket is also subject to relatively great surface wear.

German laid open specification DE 103 12 340 A1 describes a further possibility for reducing large-area surface wear. DE 103 12 340 A1 describes a sprocket, in which elastic means with a convex surface in the direction of the chain tooth tips are arranged at least in the tooth root. When a roller chain runs into the sprocket, the rollers come into contact with the elastically deformable means in the tooth root, as a result of which the convex surface is compressed and the kinetic energy is absorbed. As a result, noise damping is advantageously achieved, the surface wear being restricted exclusively to the deformable means which are arranged in the tooth root.

German laid open specification DE 199 61 046 A1 describes, for example, a further attempt to produce a low-wear sprocket. Said laid open specification has disclosed a damped sprocket of a chain drive, having damping means which consist of a damping ring which is arranged on both sides of the sprocket and has a run-on surface which preferably lies in the region of the root circle diameter of the sprocket teeth, there being a positively locking connection between the chain link plates of a control chain and the damping ring, and there being a circumferential oil gap between the sprocket and the damping ring in a manner which is dependent on the sprocket loading.

The very complicated maintenance of the circumferential oil gap around the damping ring is a disadvantage of said embodiment.

It is an object of the present invention to provide a simple, inexpensive and robust sprocket which avoids the above-mentioned disadvantages.

A simple, inexpensive and robust sprocket is achieved by way of the configuration according to the invention of the sprocket with at least one lateral damping ring which is arranged next to the toothed rim and is configured as a counter-contour of the chain link plates of the sprocket, but is not in contact with them.

Functional principle: in the region of the sprocket which is not in engagement with the chain, an oil film is formed on the surface of the damping ring on account of, for example, airborne oil particles or splash oil which has to be displaced by the chain link plates during the entry of the chain into the sprocket. Active lubrication is not absolutely necessary in contrast to the known prior art. On account of the oil film which is formed automatically, the jolt during the entry of the sleeve or roller into the tooth root as a cause of the noise (chain whine) is damped. Here, the gap between the link plate and the damping ring is to be selected to be very small, and should lie in the range of a few tenths of millimeters.

In an advantageous way, the damping ring is not subject to any wear on account of the gap, and can be produced from a conventional (non-elastomeric) material (for example, steel). It ideally consists of an identical material to the sprocket itself, and is also formed in a virtually cost-neutral manner along with the production of said sprocket, for example by way of sintering, forging or machining with the removal of material.

Other objects, advantages and novel features of the present invention will become apparent from the following detailed description of one or more preferred embodiments when considered in conjunction with the accompanying drawings.

DETAILED DESCRIPTION OF THE DRAWINGS

In the following text, the same designations apply to identical structural elements in FIGS. 1 to 3.

Figure 1:
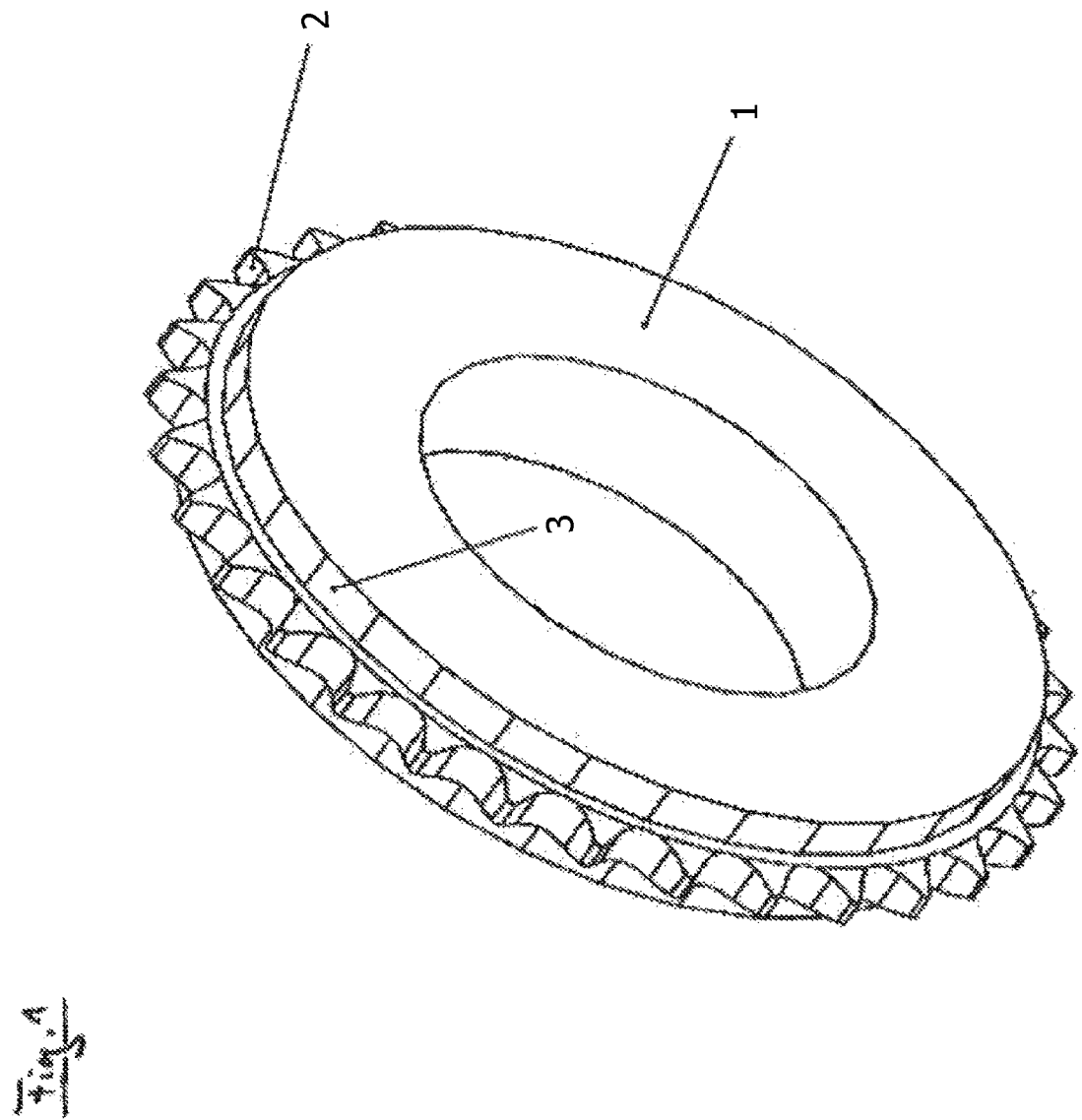
FIG. 1 shows a sprocket section according to an embodiment of the invention.
Figure 2:
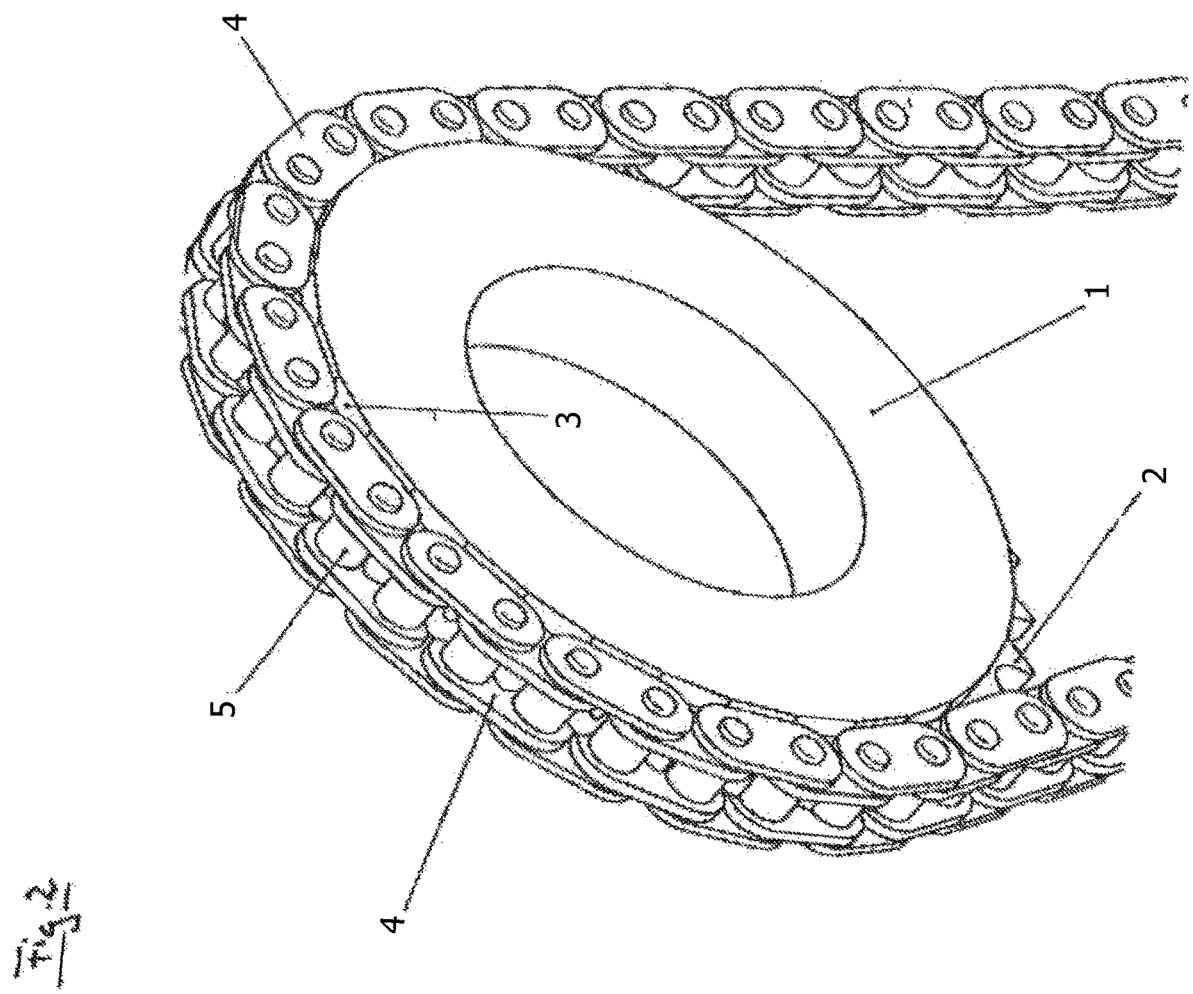
FIG. 2 shows a sprocket section according to an embodiment of the invention with a chain wrapped around it.

FIG. 1 shows a plan view of an embodiment of a sprocket section of a sprocket 1 according to the invention in a three-dimensional illustration. Centrally, the sprocket 1 has a toothed rim 2 which consists of a multiplicity of teeth. In this exemplary embodiment, a damping ring 3 is arranged on both sides in an axially adjacent manner with respect to the toothed rim 2. The damping ring 3 serves to bear chain link plates 4 of a control chain 5 of a chain drive.

FIG. 2 once again shows the sprocket section of the sprocket 1 from FIG. 1, but with a control chain 5 wrapped partially around it. The control chain 5 is a commercially available control chain 5 with chain link plates 4, for which reason the control chain 5 is not described in greater detail, since it is generally known from the prior art to a person skilled in the art.

Figure 4:
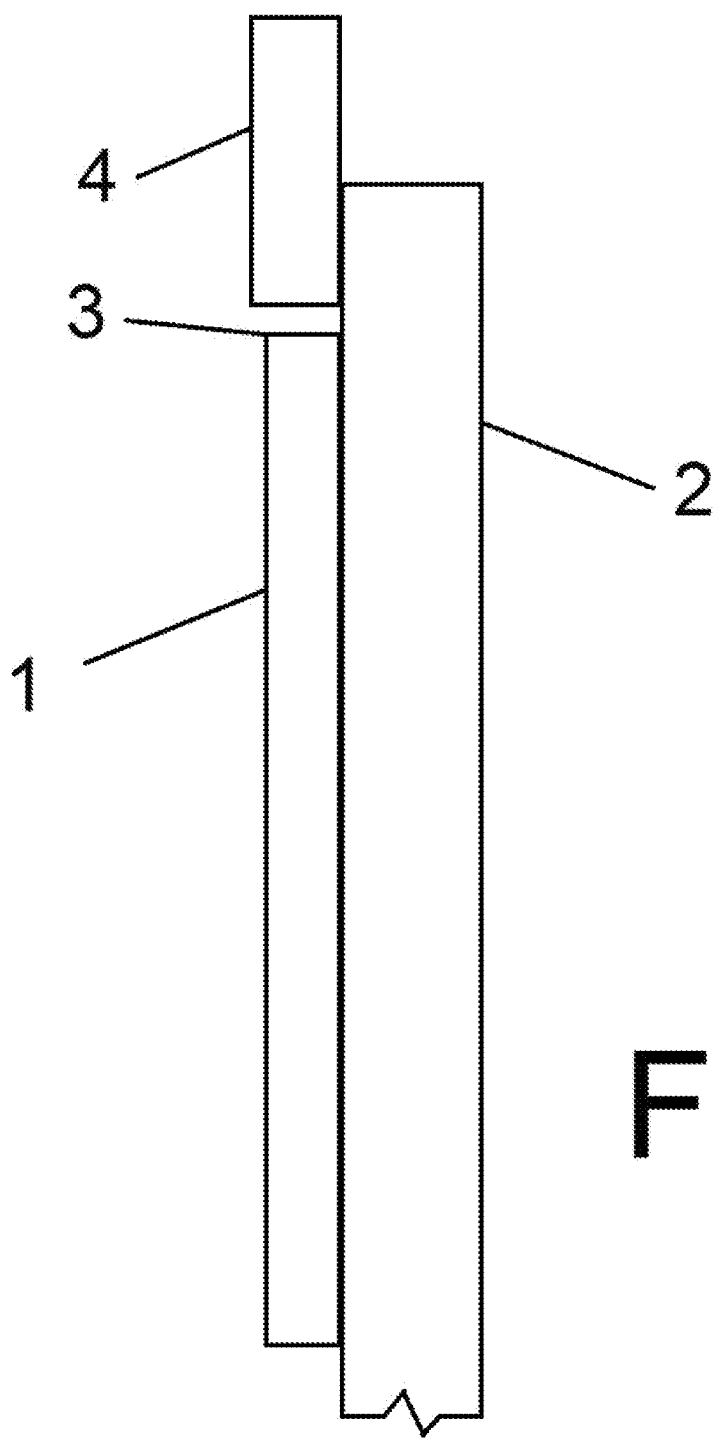
FIG. 4 shows a magnified view of a gap between a chain link and plate and a chain link plate support in accordance with the present invention.

According to the invention, the damping ring 3 has, radially on the outside, a surface which is complementary with respect to the chain link plates 4 which are in engagement with the sprocket 1. Since a small gap in the range of tenths of millimeters is configured between the chain link plates 4 and the damping ring 3 (see FIG. 4), a lubricant film is formed between the damping ring 3 and the chain link plates 4 during the operation of the chain drive, which lubricant film minimizes what is known as "chain whine".

The damping ring 3 is preferably made from the same material as the sprocket 1, as a result of which wear is counteracted effectively. Furthermore, the sprocket 1 and the damping ring 3 are preferably made in one piece and from the same material, and are manufactured jointly, for example, by way of sintering or forging or the removal of material.

Functional principle: in the region of the sprocket which is not in engagement with the chain, an oil film is formed on the surface of the damping ring on account of, for example, airborne oil particles or splash oil which has to be displaced by the chain link plates during the entry of the chain into the sprocket. Active lubrication is not absolutely necessary in contrast to the known prior art. On account of the oil film which is formed automatically, the jolt during the entry of the sleeve or roller into the tooth root as a cause of the noise (chain whine) is damped. Here, the gap between the link plate and the damping ring is to be selected to be very small, and should lie in the range of a few tenths of millimeters.

In an advantageous way, the damping ring is not subject to any wear on account of the gap, and can be produced from a conventional (non-elastomeric) material (for example, steel). It ideally consists of an identical material to the sprocket itself, and is also formed in a virtually cost-neutral manner along with the production of said sprocket, for example by way of sintering, forging or machining with the removal of material.

Figure 3:
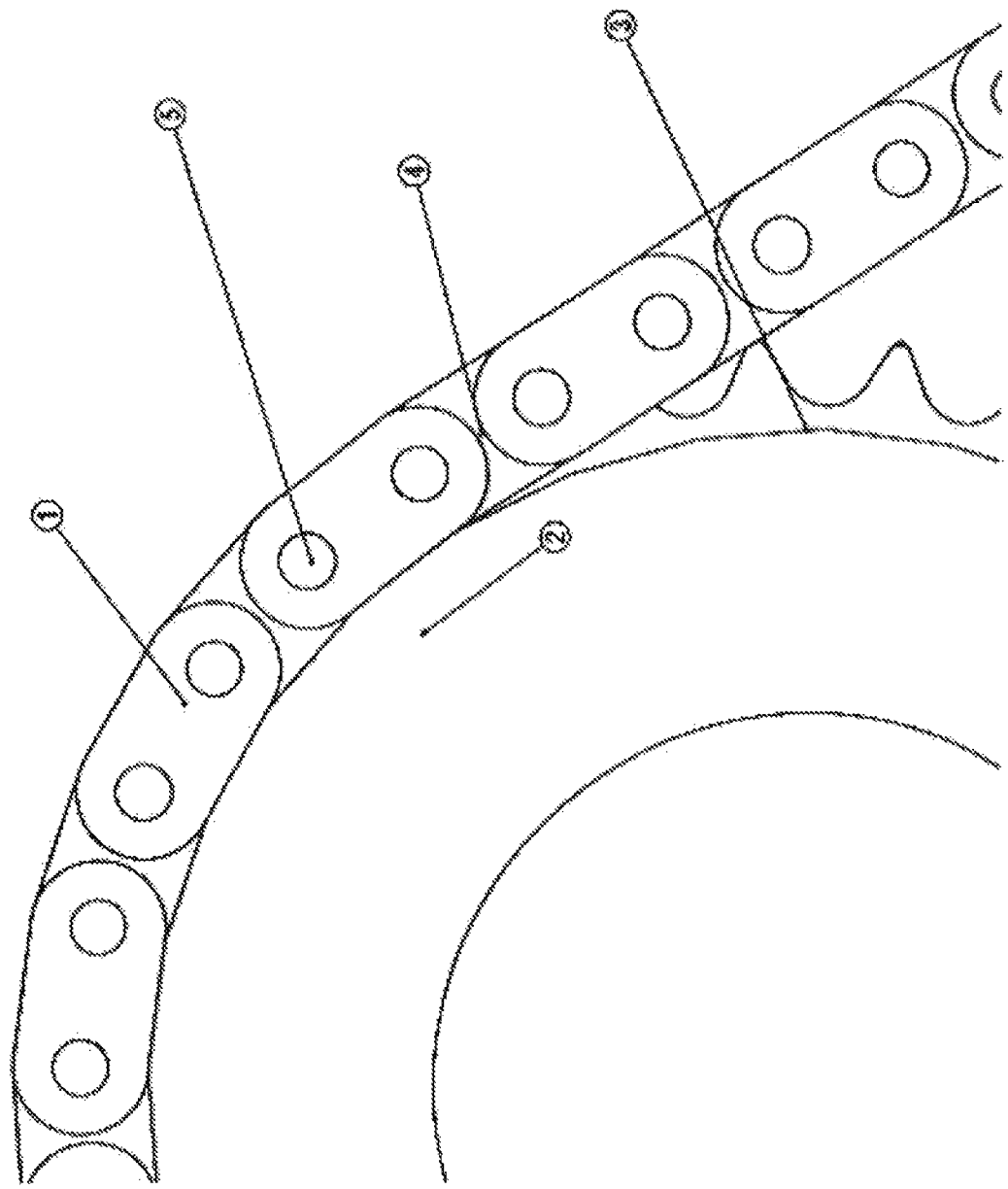
FIG. 3 shows a side view of a sprocket section according to an embodiment of the invention with a chain wrapped around it.

FIG. 3 also shows a side view of the sprocket section according to the invention of the sprocket 1 with a chain wrapped around it. As can be seen in FIG. 3, the chain link plates 4 have planar bearing faces in said exemplary embodiment, that is to say the complementary surfaces of the damping ring 3 are also planar in the bearing region. The bearing region of the damping ring 3 is therefore a regular polygon. The number of planar surfaces is, for example, dependent on the transmission ratio which is aimed for or else on the diameter of the damping ring 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Sprocket
2 Toothed rim
3 Damping ring
4 Chain link plate
5 Control chain

What is claimed is:

1. A sprocket for a chain mechanism, comprising:
   a center section;
   a toothed rim configured radially on an outside circumference of the center section, the toothed rim having a plurality of tooth recesses configured to receive rollers of a chain; and
   a damping ring axially adjacent to the toothed rim,
   wherein
     the damping ring includes a plurality of chain link plate support surfaces,
     each of the plurality of chain link plate support surfaces is located axially adjacent to a corresponding tooth of the toothed rim,
     each of the plurality of chain link plate support surfaces has a support surface shape configured to be complementary with respect to chain link plates of a chain when the chain is engaged with the toothed rim, and
     the plurality of chain link plate support surfaces has a radial height below a radial height of a radially smallest portion of the tooth recesses such that a gap is formed between each of the plurality of chain link plate support surfaces and a respective chain link plate of the chain, the gap being sized to accommodate an oil film between and in contact with the plurality of chain link plate support surfaces and the respective chain link plates.

2. The sprocket as claimed in claim 1, wherein the damping ring is made from the same material as the toothed rim.

3. The sprocket as claimed in claim 2, wherein the center section, the toothed rim and the damping ring are made in one piece and from the same material.

4. The sprocket as claimed in claim 3, wherein the center section, the toothed rim and the damping ring are sintered, forged or machined.

* * * * *